(12) United States Patent
Debal

(10) Patent No.: US 6,396,992 B1
(45) Date of Patent: May 28, 2002

(54) INTEGRAL PATCH PANEL AND CABLE MANAGEMENT TRAY ASSEMBLY AND METHOD OF MANUFACTURE

(75) Inventor: Patrick A. J. Debal, Pellenberg (BE)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/481,631

(22) Filed: Jan. 12, 2000

(30) Foreign Application Priority Data

Jan. 14, 1999 (EP) .............................. 99300216

(51) Int. Cl.⁷ ................................................ G02B 6/00
(52) U.S. Cl. ........................................ 385/135; 385/134
(58) Field of Search .............................. 385/134, 135, 385/147

(56) References Cited

U.S. PATENT DOCUMENTS

| | | | |
|---|---|---|---|
| 2,544,266 A | 3/1951 | Kennedy .................. | 113/120 |
| 4,818,054 A | 4/1989 | George et al. ............ | 350/96.2 |
| D317,750 S | 6/1991 | Bellomo et al. .......... | D13/147 |
| 5,329,086 A | 7/1994 | De Matteis et al. ....... | 219/756 |
| 5,408,570 A * | 4/1995 | Cook et al. ................ | 385/134 |
| 5,412,751 A | 5/1995 | Siemon et al. ............ | 385/135 |
| 5,459,808 A * | 10/1995 | Keith ........................ | 385/135 |
| 5,575,665 A | 11/1996 | Shramawick et al. ...... | 439/49 |
| 5,577,151 A | 11/1996 | Hoffer ....................... | 385/135 |
| 5,640,482 A | 6/1997 | Barry et al. ............... | 385/135 |
| 5,731,546 A | 3/1998 | Miles et al. ............... | 174/135 |
| 5,825,962 A | 10/1998 | Walters et al. ............ | 385/135 |
| 6,012,585 A * | 1/2000 | Parker ....................... | 206/570 |

FOREIGN PATENT DOCUMENTS

| | | | |
|---|---|---|---|
| DE | 9202912 U | 4/1992 | ............ H04Q/1/14 |
| DE | 9408224 U | 9/1994 | ............ H04Q/1/14 |
| DE | 29519388 U | 2/1996 | ............ H04Q/1/14 |

OTHER PUBLICATIONS

Copy of European Search Report in English for European Patent Application No. 99 30 0216; wherein the appropriate relevant passages in the above–identified German references are indicated; dated Jun. 21, 1999.

* cited by examiner

Primary Examiner—John D. Lee
(74) Attorney, Agent, or Firm—Hoffmann & Baron, LLP

(57) ABSTRACT

An integral one-piece patch panel and cable management tray assembly formed from a single sheet of material comprising a substantially planar front patch panel portion, a cable management tray extending rearwardly of the front patch panel portion and securement arms extending between the cable management tray and the front patch panel portion to reinforce the formed structure. The method of manufacture comprises the steps of taking a sheet of formable material, forming holes as desired, bending the sheet material to provide the front patch panel portion and tray, bending the sheet material to provide securement arms and securing the free end of each arm to the sheet material to provide the enforcement of the formed sheet structure.

5 Claims, 5 Drawing Sheets

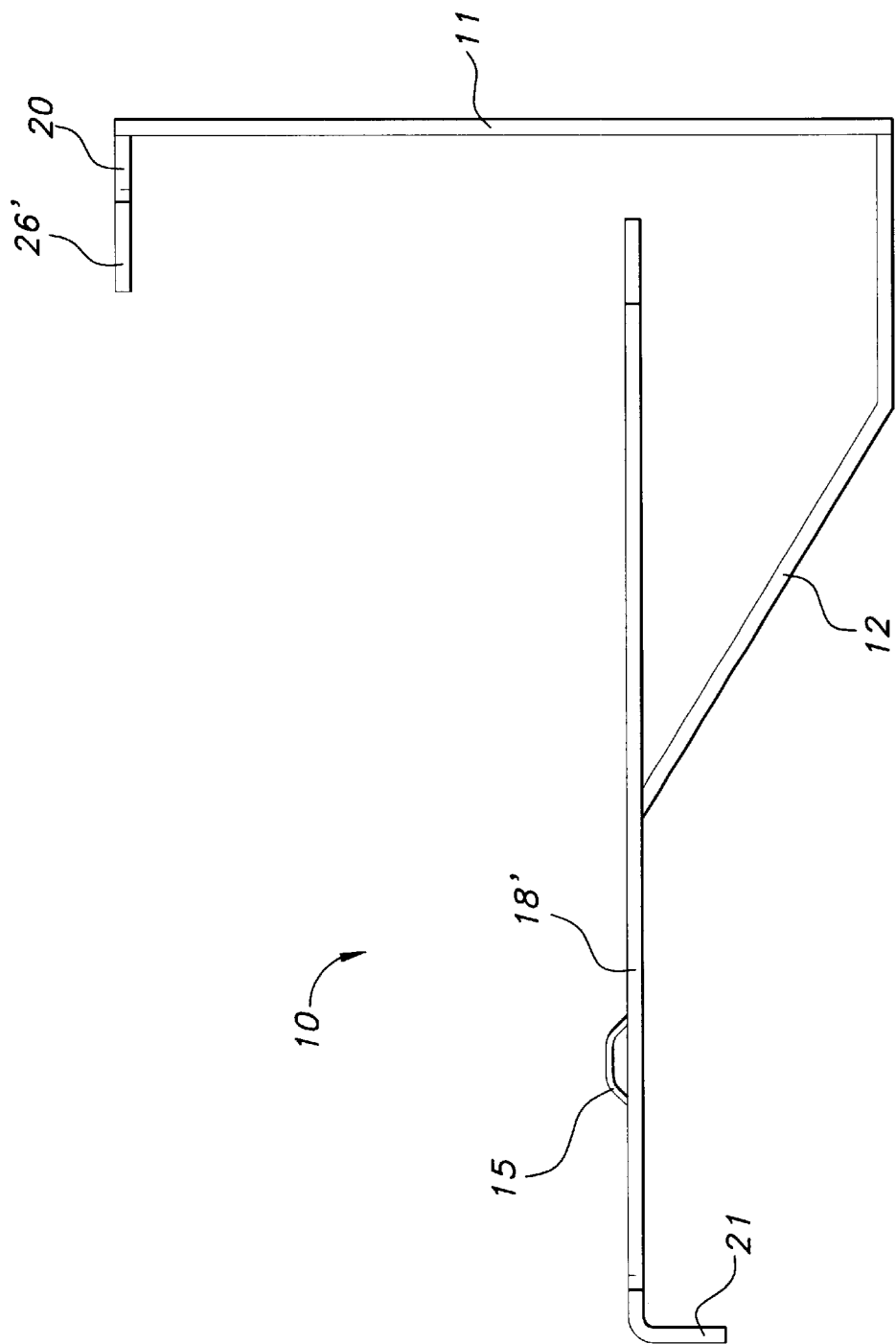

INTEGRAL PATCH PANEL AND CABLE MANAGEMENT TRAY ASSEMBLY AND METHOD OF MANUFACTURE

FIELD OF THE INVENTION

The present invention relates generally to management of cabling and in particular to the management of data and voice communications cabling which is terminated to patch panels, racks and the like. In even greater particularity, the present invention is directed to an integral one-piece patch panel and cable management tray assembly which is formed from a single sheet of material.

BACKGROUND OF THE INVENTION

In the telecommunications and premise wiring industry, it is commonplace for large numbers of connectors to be loose at a single location, for example, on a patch panel. Typically large numbers of cables will be connected to the connectors. It is desirable for the cables to be orderly arranged at the rear of the panel to make removal of a single given cable easy and to avoid an unsightly mess of cable. It is also important that the mass of the cable does not cause the cable connections to the connectors to become overstrained. To that end, it is known to provide a cable management tray across the back of the patch panel which allows cable organization and strain relief However, such combinations of a patch panel and cable management tray have been typically manufactured from two separate sheets of material, the patch panel front and cable management tray being separately formed then attached together using conventional techniques. This manufacturing technique is somewhat difficult and costly, and on some on occasions, may be unreliable.

Accordingly, in view of the foregoing drawbacks with currently available patch panel and cable management tray assemblies, an improved integral patch panel and cable management tray assembly and method are needed to overcome difficulties in manufacturing and to provide benefits of costs and reliability.

SUMMARY OF THE INVENTION

In accordance with the purposes of the invention as embodied and broadly described herein, the present invention addresses the above needs by providing an integral one-piece cable management assembly comprising a substantially planar front patch panel; a cable management tray extending rearwardly of the front patch panel; and securement arms extending between the cable management tray and the patch panel for reinforcing the formed assembly structure wherein the patch panel, the cable management tray and the securement arms are formed from a single sheet of material. In a preferred embodiment, the cable management tray extends rearwardly from a lower edge of the front patch panel, the cable management tray including a base portion horizontally positioned at the lower edge of the patch panel and a cable management support portion attached to the base portion. The front patch panel further comprises a flange extending rearwardly of an upper edge of the front patch panel and generally parallel to the base portion. The flange includes end portions which are bent to lie generally perpendicular to the plane of the flange to provide securement elements to which the securement arms are secured. The securement arms are positioned at each end of the cable management support portion respectively and are each folded to lie in a plane normal to the planes of the front patch panel and the cable management support portion, each arm being secured to a corresponding securement element. Preferably, the securement arms are welded to the securement elements.

A method of manufacturing an integral one-piece cable management assembly is also provided by the present invention which, in a preferred embodiment, comprises the steps of providing a sheet of formable material; forming holes in the sheet material to accept cables and fasteners; bending the sheet material to provide a substantially planar front patch panel portion and a cable management tray extending rearwardly of the front patch panel portion; further bending the sheet material to provide securement arms; and securing a free end of each of the securement arms to the sheet material to provide reinforcement of the formed assembly. Preferably, the free end of each of the securement arms is secured to the front patch panel portion by spot welding. The method may further include the steps of bending an upper edge of the front patch panel portion to create a rearwardly extending flange; bending each end of the flange to create end support portions lying normal to both the front patch panel portion and the flange; and securing each of the end support portions to an associated securement arm. These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Note particularly that the appended drawings are not necessarily drawn to scale. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which:

FIGS. 4 and 5 are side elevational views of the patch panel and cable management tray assembly of FIG. 1 showing a bending profile of the sheet material embodying features of the present invention.

DETAILED DESCRIPTION

Figure 1:
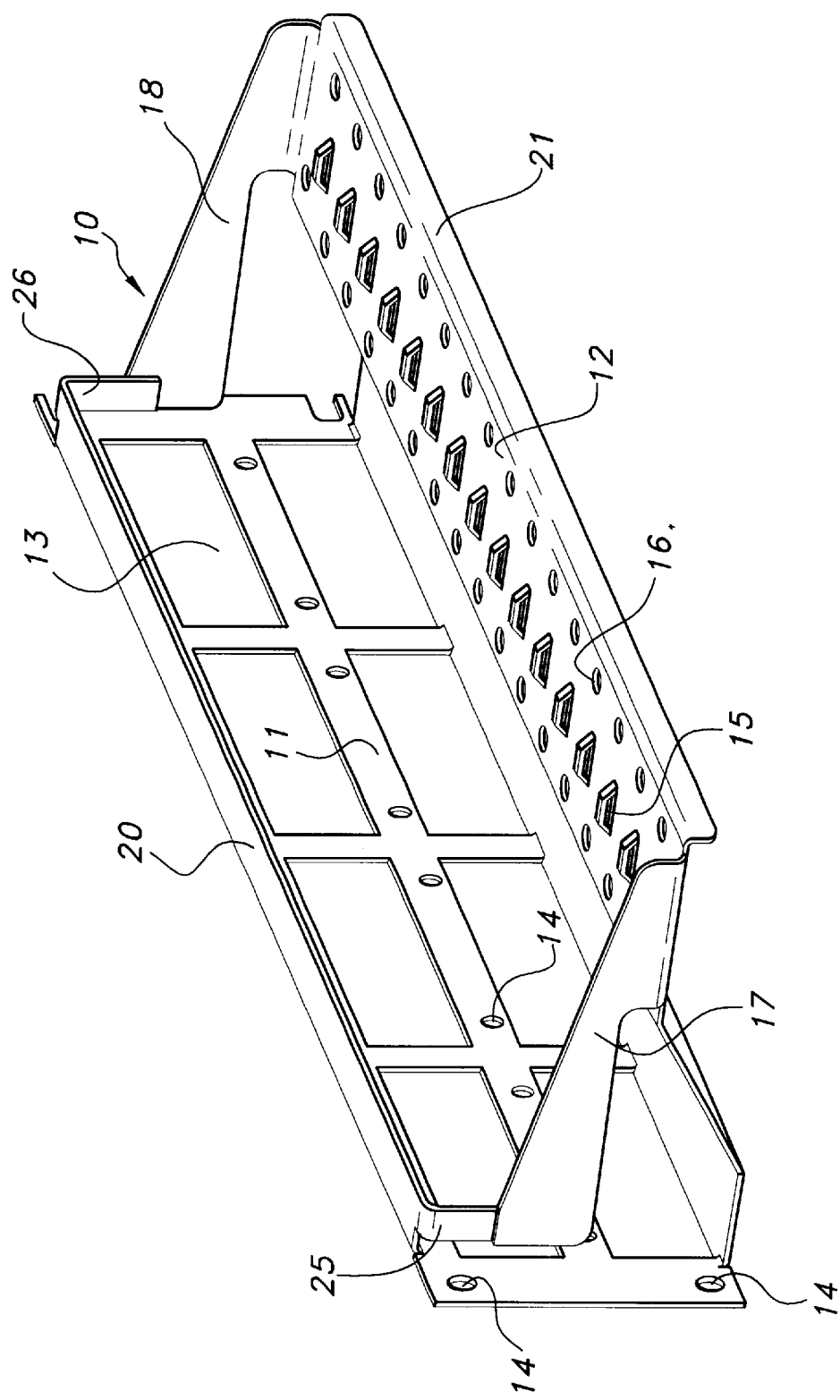
FIG. 1 is a rear perspective view of an integral one-piece patch panel and cable management tray assembly embodying features of the present invention.

Referring to the drawings, a representative one-piece integral patch panel and cable management tray assembly, embodying various features of the present invention, is generally indicated throughout the figures by reference character 10. As illustrated, and more fully described below, assembly 10 is manufactured from one sheet of a suitable formable material such as sheet metal. Assembly 10 preferably comprises two primary portions: a patch panel 11 and a cable management tray 12 whose purpose and functions are known in the art.

Initially, the external shape or profile of assembly 10 is stamped from the sheet material (not shown). As will be discussed below in greater detail, the external shape of patch panel 11 includes end securement portions or flanges 25, 26 and the cable management tray 12 includes support or securement arms 17, 18. Next, while assembly 10 is still in flat coplanar sheet form, appropriate holes and/or apertures are fashioned in the patch panel 11 preferably by stamping the sheet material. In a preferred embodiment, rectangular holes 13 for supporting connectors and cables and round holes 14 for passage of standard fasteners such as screws or bolts are provided. Likewise, cable alignment nodules 15 and holes 16, through which screws, bolts, cable ties, or other fasteners may pass, are formed or pressed into the cable management tray 12. It should be understood that the present invention is not limited to the above precise holes and nodules, but should contemplate a wide variety of other designs as the circumstance warrants.

Figure 4:
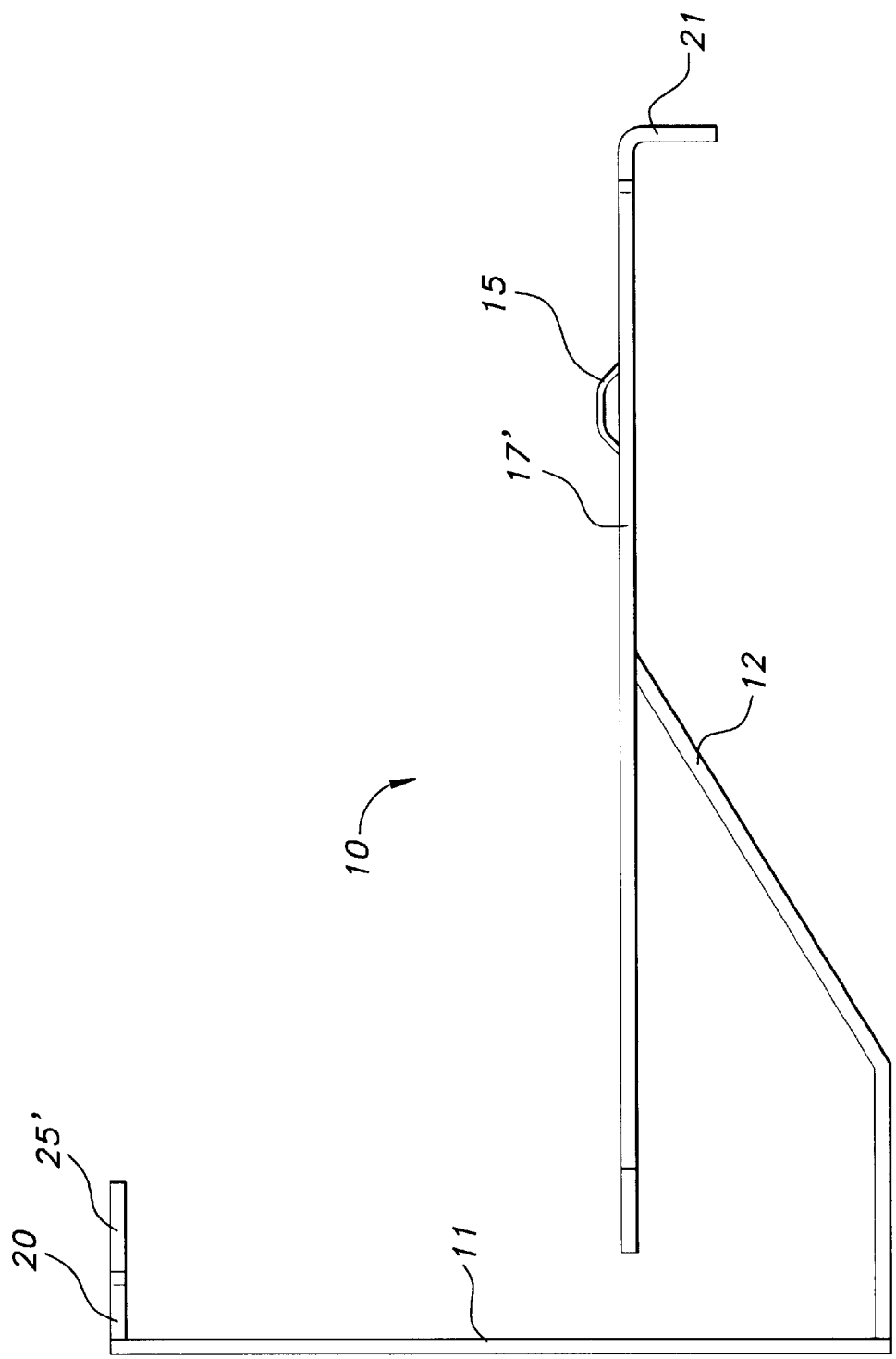

Once the external shape and internal openings and profiles have been formed, the sheet material is then bent in accordance with a main bending profile as indicated in FIGS. 4 and 5. These figures clearly show the main elements of the patch panel 11 and cable management tray 12 as well as an upper flange 20 extending rearwardly of the patch panel 11 and a rear rib 21 extending downwardly from the cable management tray to add rigidity to it. As most clearly shown in FIG. 2, the cable management tray 12 includes a base portion 29 and a cable management support portion 30.

Figure 2:
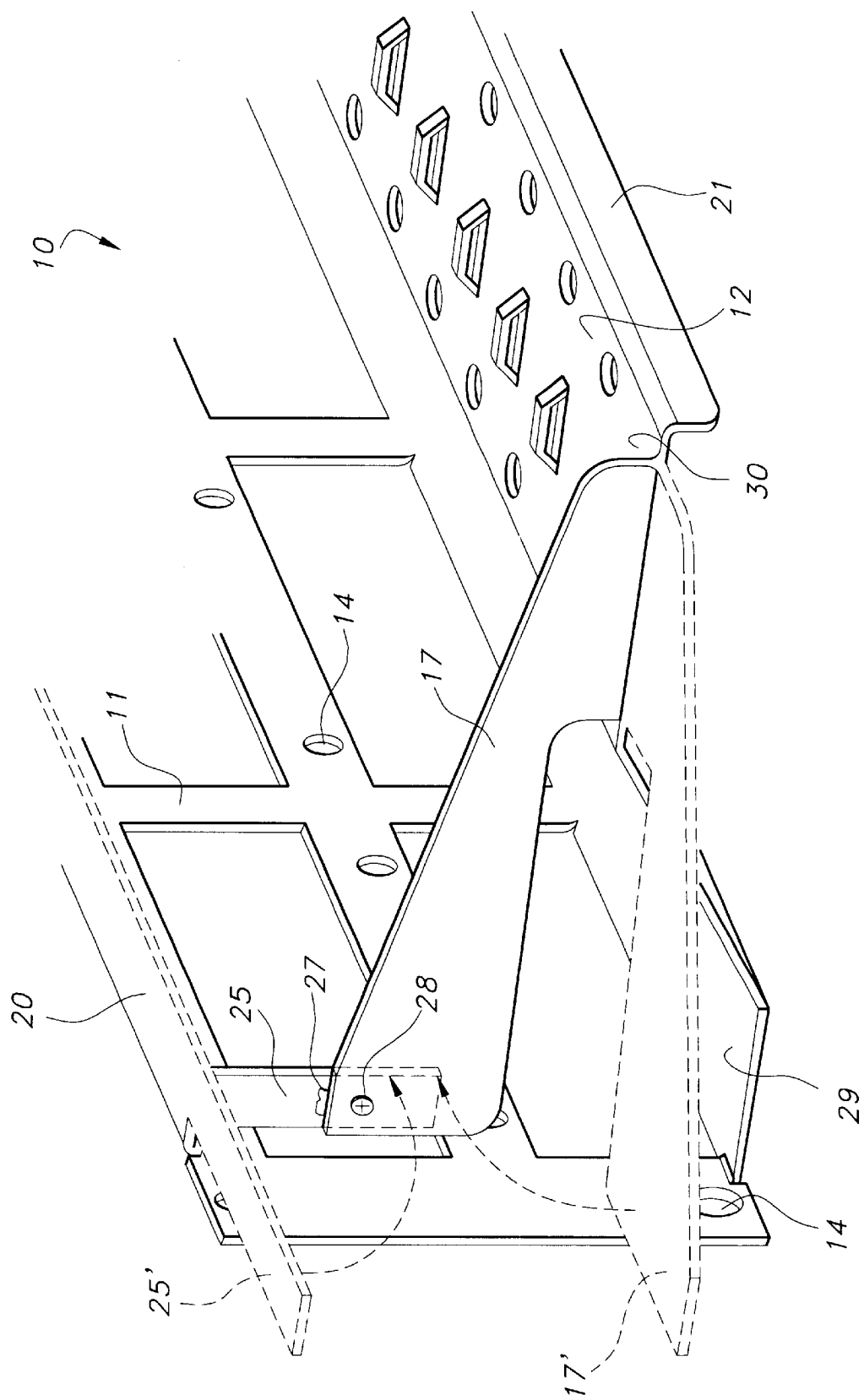
FIG. 2 is an enlarged perspective view of part of FIG. 1 showing additional detail of the assembly embodying features of the present invention.
Figure 3:
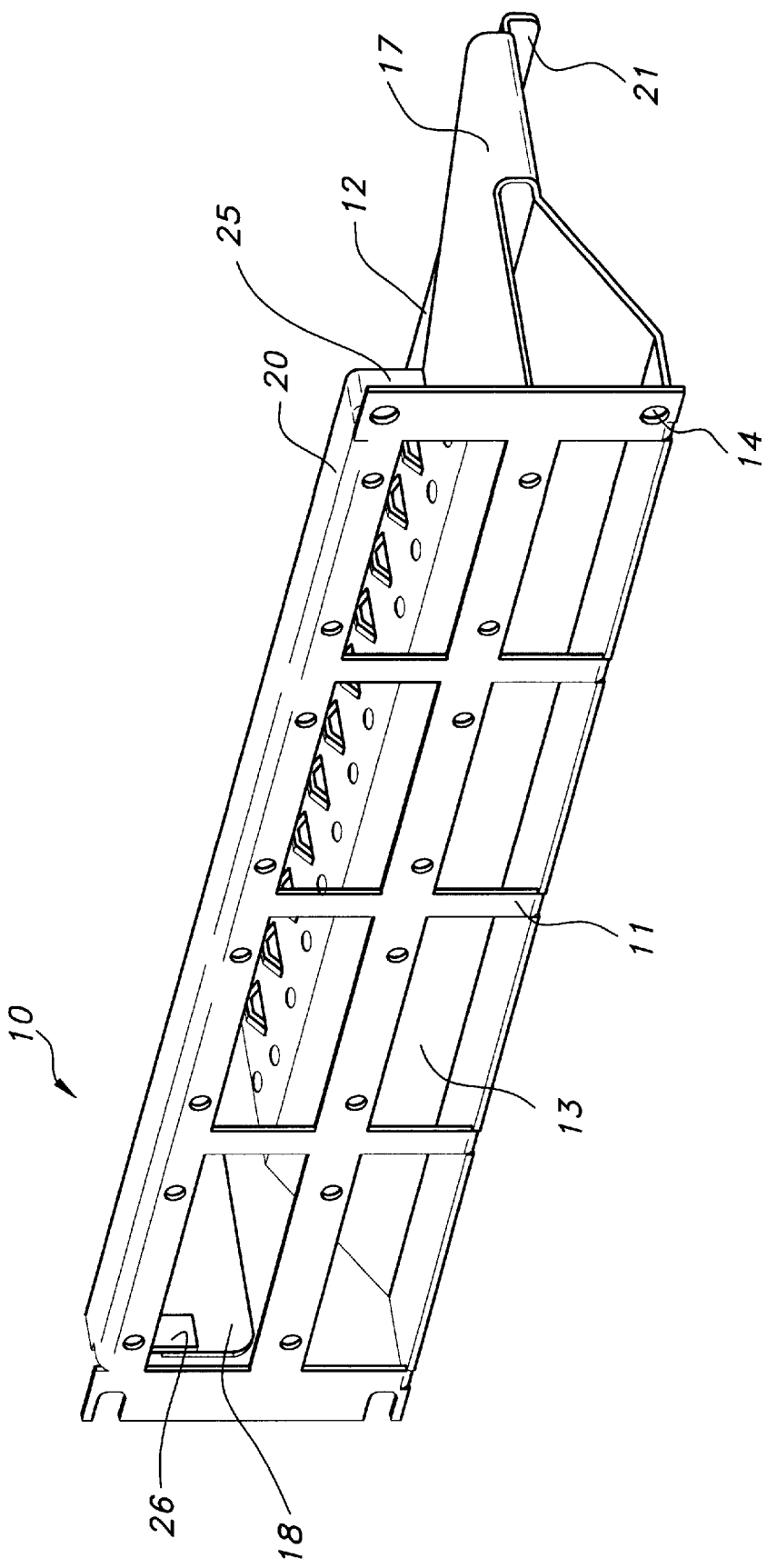
FIG. 3 is a front perspective view of the patch panel and cable management tray assembly of FIG. 1 embodying features of the present invention.

FIGS. 2, 4 and 5 show in more detail the arrangement of the securement arms 17, 18 and how they are attached to the patch panel 11. When formed originally, before the sheet material is bent in accordance with FIGS. 4 and 5, the securement arms 17, 18 lie in the plane of the sheet material (i.e., coplanar). After the first bending of the assembly to that shown in FIGS. 4 and 5, the arms 17, 18 still lie in the plane of the cable management support portion 30 of tray 12. For clarity purposes only, arms 17, 18 have been denoted 17' and 18' in this position in FIGS. 2, 4 and 5. Next, as most clearly shown in FIG. 2, arms 17', 18' are bent to lie in their ultimate position, denoted 17, 18, perpendicular to the plane of the cable management tray 12.

Again referring to FIG. 2, flange 20 further includes end securement portions 25, 26 at each end which extend outwardly as a cantilever after the external profile of the material is formed. For clarity purposes only, these positions of portions 25, 26 are shown in dotted lines and are denoted 25', 26'. Next, as most clearly shown in FIG. 2, the end portions 25, 26 are bent downwardly from the plane of the flange 20 to lie perpendicular both to the plane of the patch panel 11 and to the plane of the flange 20. In this way, the end securement portions 25, 26 and the securement arms 17, 18 lie against one another respectively and can be secured using conventional techniques, for example, by spot weld 27 or bolt 28 through the sheets.

Formation of the assembly 10 is thus a straight forward exercise from sheet material stamped and then bent with a straightforward spot weld 27 or nut and bolt 28 to secure the structure. This is a significant advantage over prior art assembly both from the point of view of ease of manufacture, cost, and also reliability and strength.

Although preferred embodiments of the present invention have been described above by way of example, it will be understood by those skilled in the field that modifications may be made to the disclosed embodiments which are within the scope of the invention as defined by the appended claims. For example, it is contemplated that the manufacturing steps described above may be taken in a variety of different orders. Thus, the order of manufacturing steps should not be limited to what is exactly described above.

What is claimed is:

1. An integral one-piece cable management assembly, comprising:
    (a) a substantially planar front patch panel;
    (b) a cable management tray extending rearwardly of said front patch panel; and
    (c) securement arms extending between said cable management tray and said patch panel for reinforcing the formed assembly structure wherein said patch panel, said cable management tray and said securement arms are formed from a single sheet of material.

2. The cable management assembly of claim 1, wherein said cable management tray extends rearwardly from a lower edge of said front patch panel, said cable management tray including a base portion horizontally positioned at the lower edge of said patch panel and a cable management support portion attached to said base portion.

3. The cable management assembly of claim 2, wherein said front patch panel further comprises a flange extending rearwardly of an upper edge of said front patch panel and generally parallel to said base portion, said flange including end portions which are bent to lie generally perpendicular to the plane of said flange to provide securement elements to which said securement arms are secured.

4. The cable management assembly of claim 3, wherein said securement arms are positioned at each end of said cable management support portion respectively and are each folded to lie in a plane normal to the planes of said front patch panel and said cable management support portion, each said arm being secured to a corresponding securement element.

5. The cable management assembly of claim 4, wherein said securement arms are welded to said securement elements.

* * * * *